United States Patent [19]

Shibata

[11] Patent Number: 5,570,234
[45] Date of Patent: Oct. 29, 1996

[54] COMPACT WIDE-ANGLE VARIABLE FOCAL LENGTH LENS SYSTEM

[75] Inventor: Hironori Shibata, Tokyo-To, Japan

[73] Assignee: Olympus Optical Co., Ltd., Tokyo-To, Japan

[21] Appl. No.: 207,145

[22] Filed: Mar. 8, 1994

[30] Foreign Application Priority Data

Mar. 8, 1993 [JP] Japan .................................. 5-070800

[51] Int. Cl.$^6$ ....................................... G02B 15/14
[52] U.S. Cl. .................. 359/690; 359/689; 359/780; 359/784
[58] Field of Search ................... 359/689, 690, 359/784, 785, 787, 788, 686, 687

[56] References Cited

U.S. PATENT DOCUMENTS

| | | | |
|---|---|---|---|
| 4,721,371 | 1/1988 | Imai | 359/689 |
| 4,854,683 | 8/1989 | Ozawa | 359/689 |
| 4,991,942 | 2/1991 | Fujibayashi et al. | 359/690 |
| 5,260,834 | 11/1993 | Shibata et al. | 359/690 |

FOREIGN PATENT DOCUMENTS

| | | |
|---|---|---|
| 1246517 | 10/1989 | Japan . |
| 2291515 | 12/1990 | Japan . |
| 4307509 | 10/1992 | Japan . |

Primary Examiner—David C. Nelms
Assistant Examiner—Vu A. Le
Attorney, Agent, or Firm—Cushman, Darby & Cushman

[57] ABSTRACT

A wide-angle variable focal length lens system comprising a first lens unit which is to be kept stationary for varying a focal length of the variable focal lens system and composed of a single positive lens component, a second lens unit which comprises at least one positive lens component and has a negative refractive power as a whole, a stop, and a third lens unit having a positive refractive power; and configured so as to perform variation of a focal length of the lens system and adjustment of an image location by moving the second lens unit and the third lens unit along an optical axis in directions which are opposite to each other. This variable focal length lens system has a field angle of 64° to 74° at a wide position thereof, a variable focal length ratio of 3 to 3.3 and an F number on the order of 2, and comprises a small number of lens components.

6 Claims, 16 Drawing Sheets

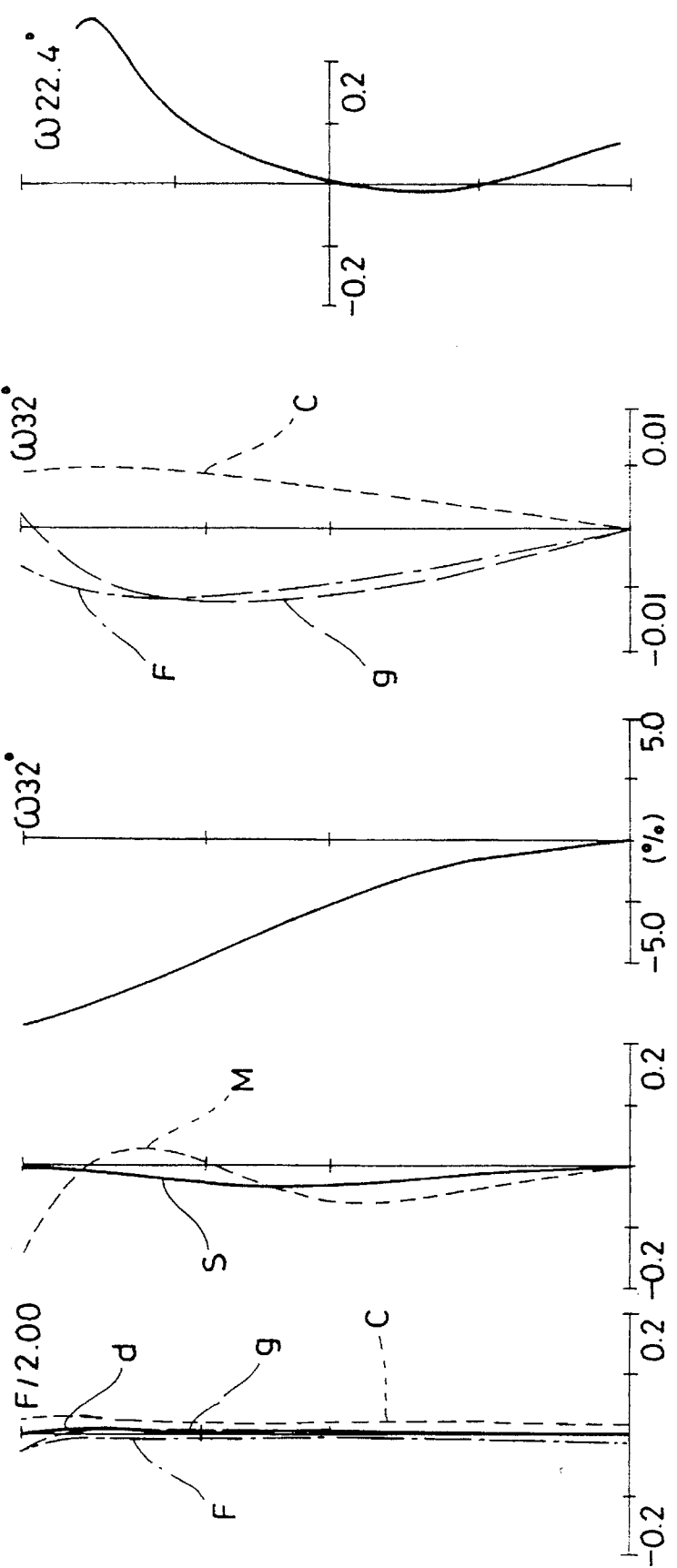

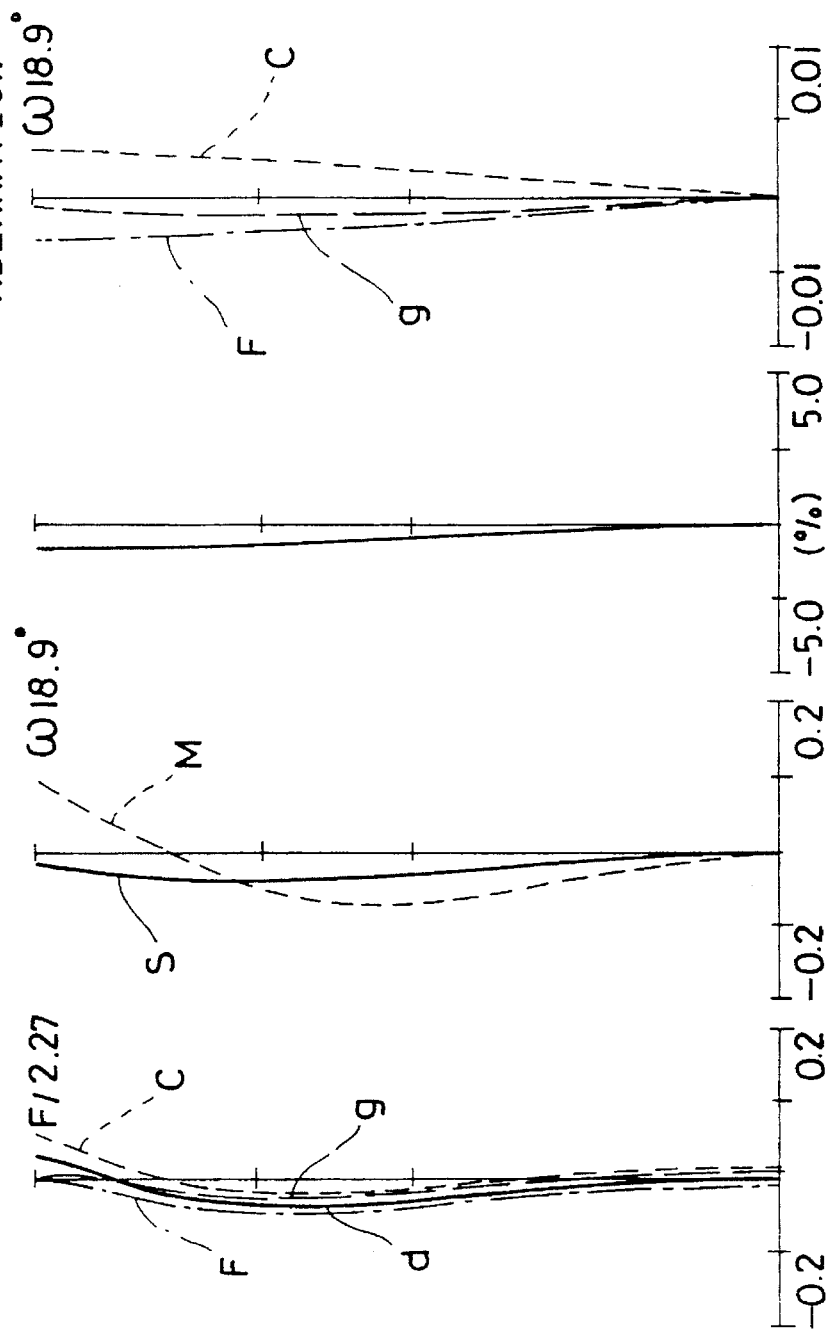

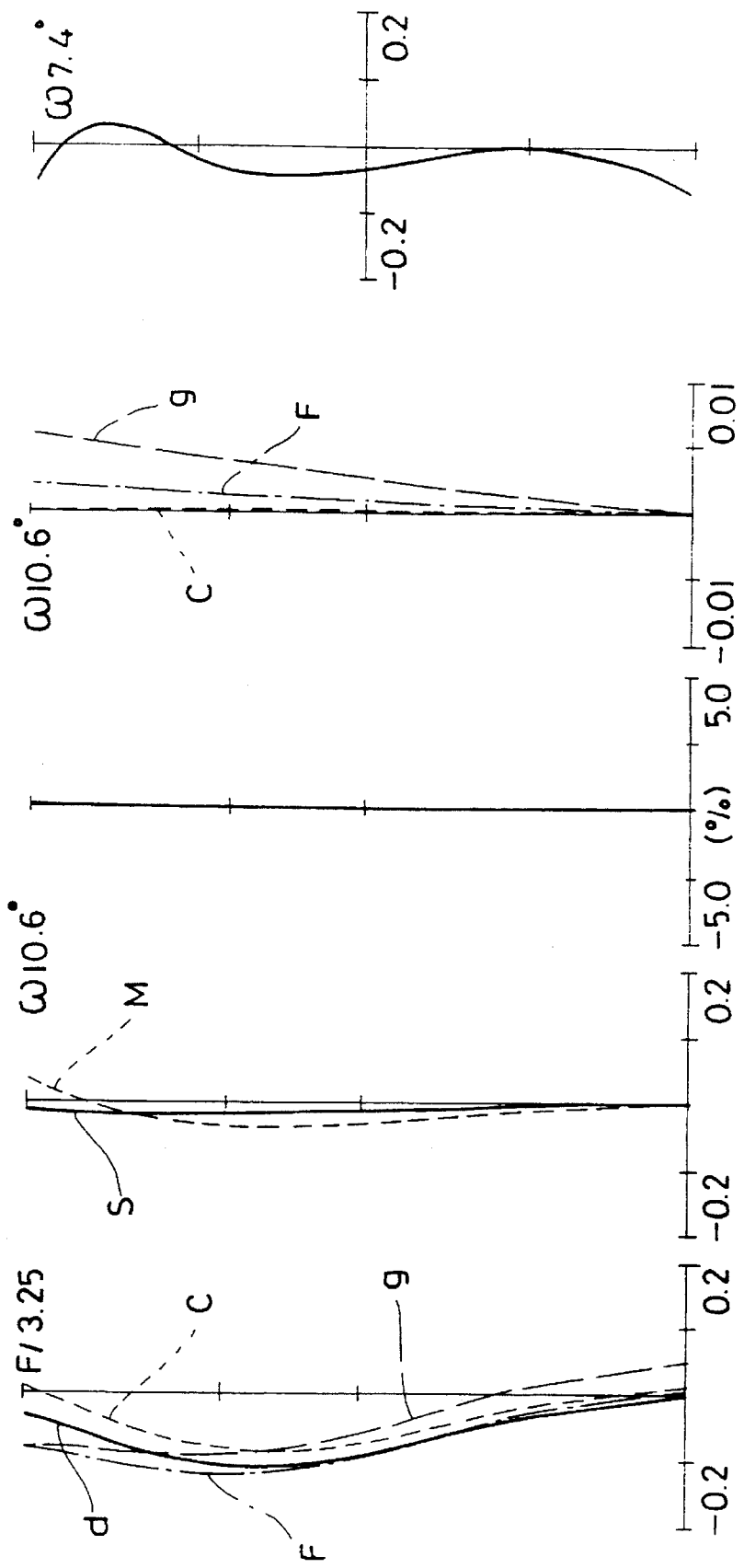

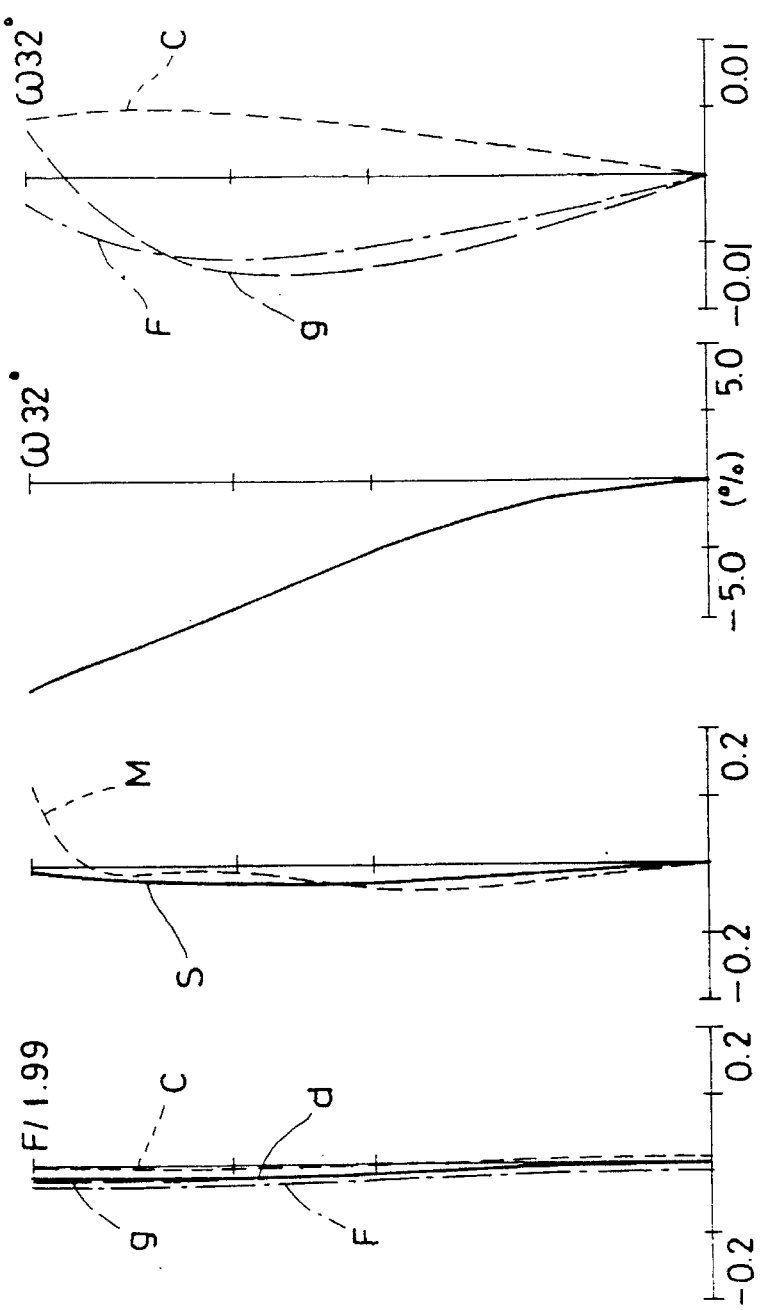

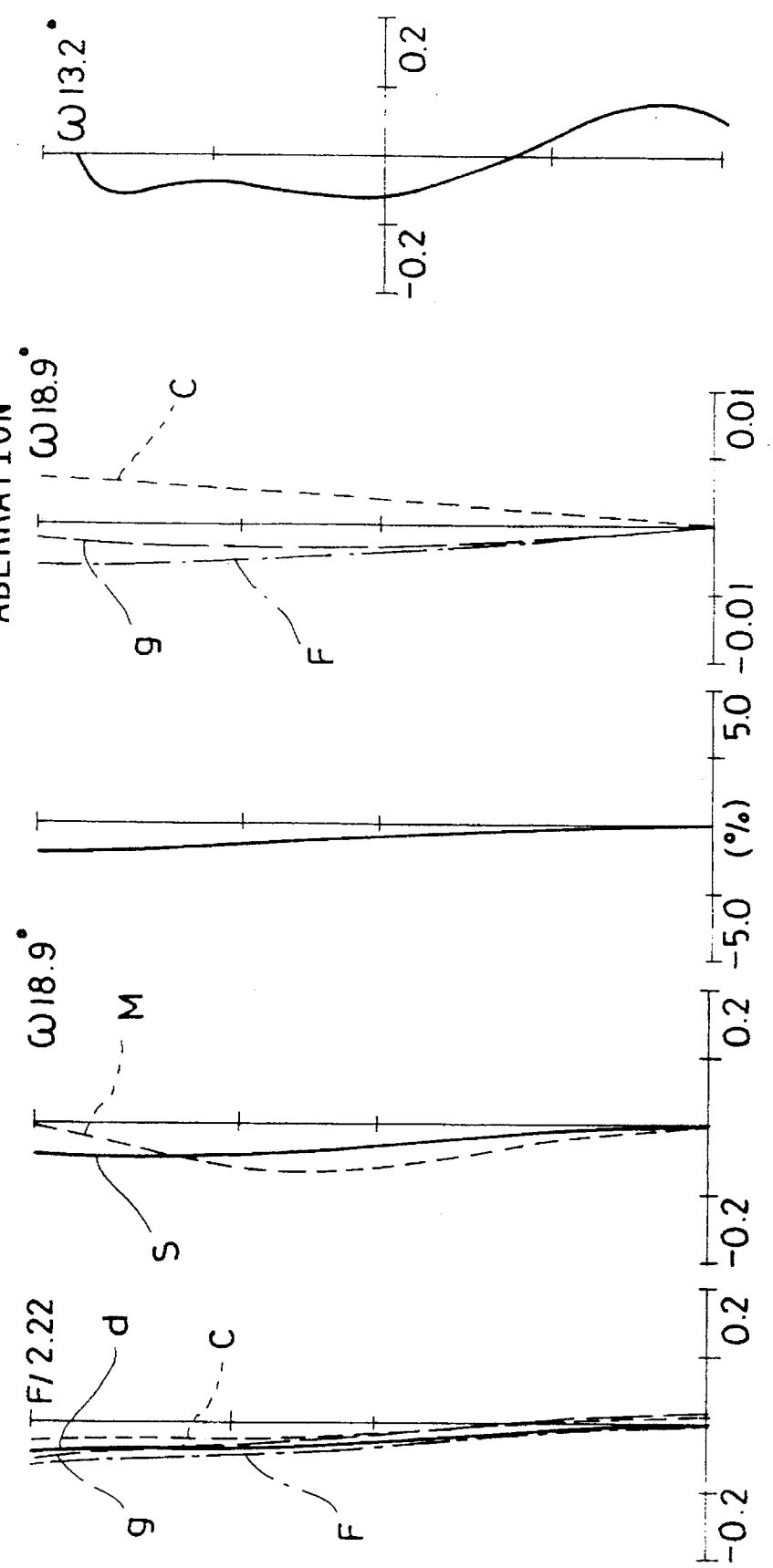

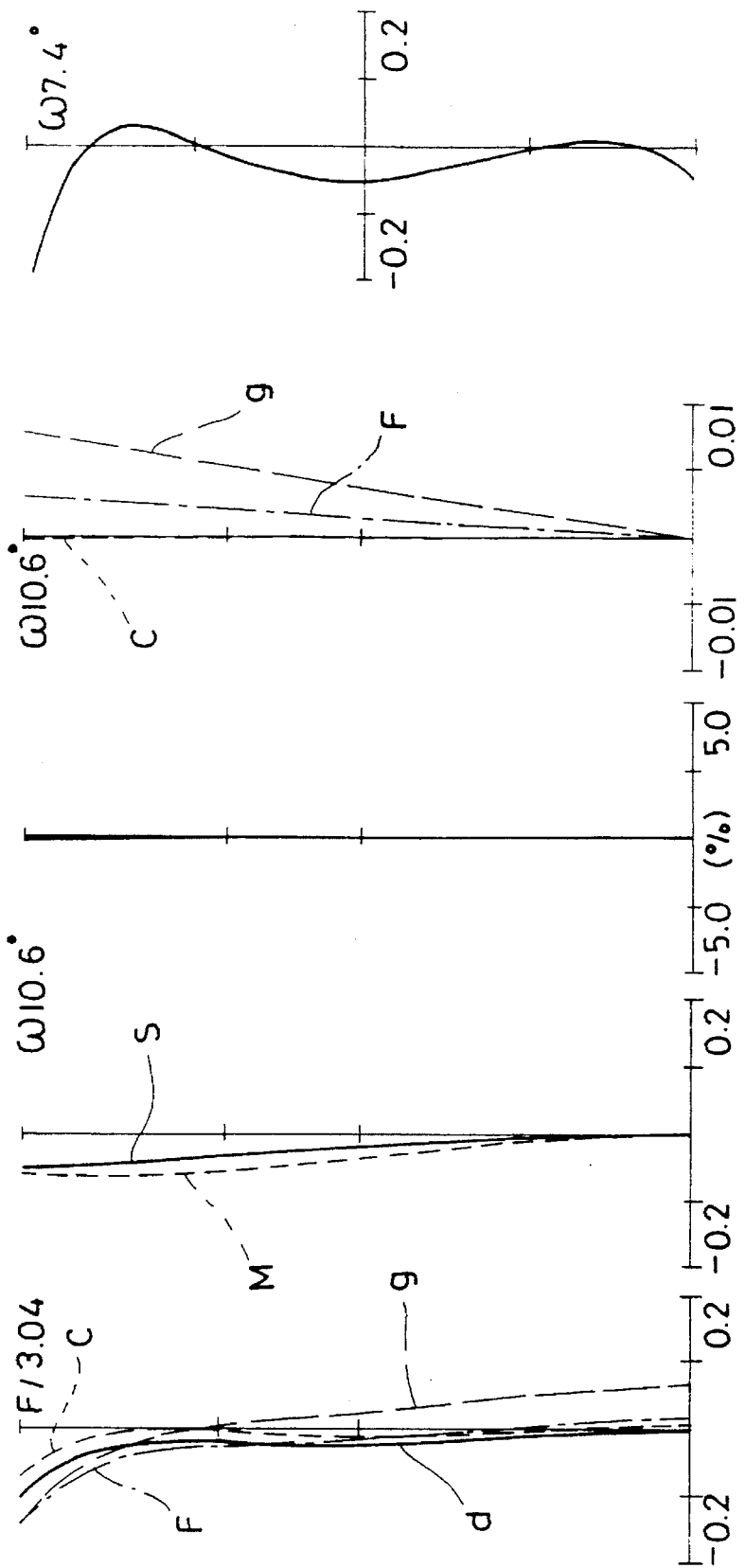

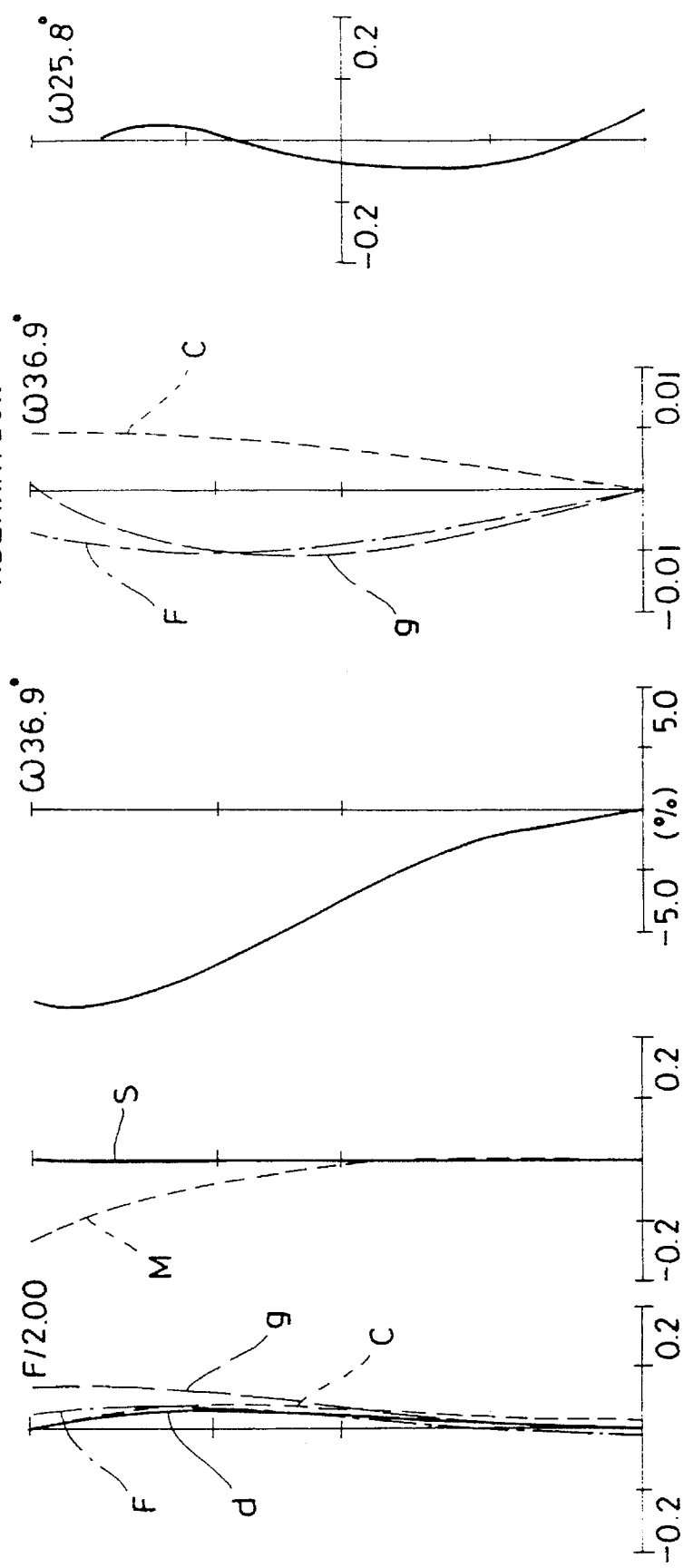

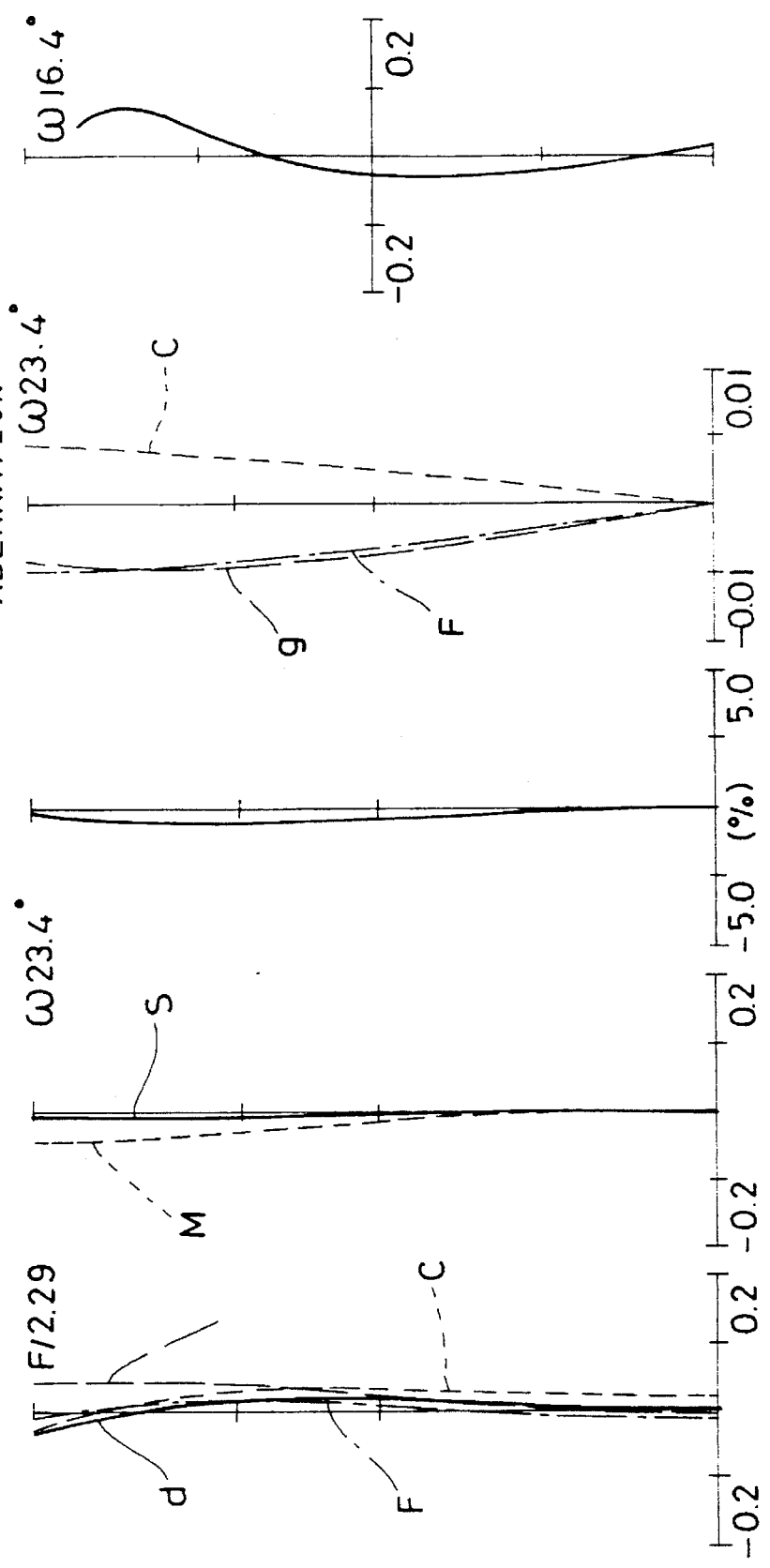

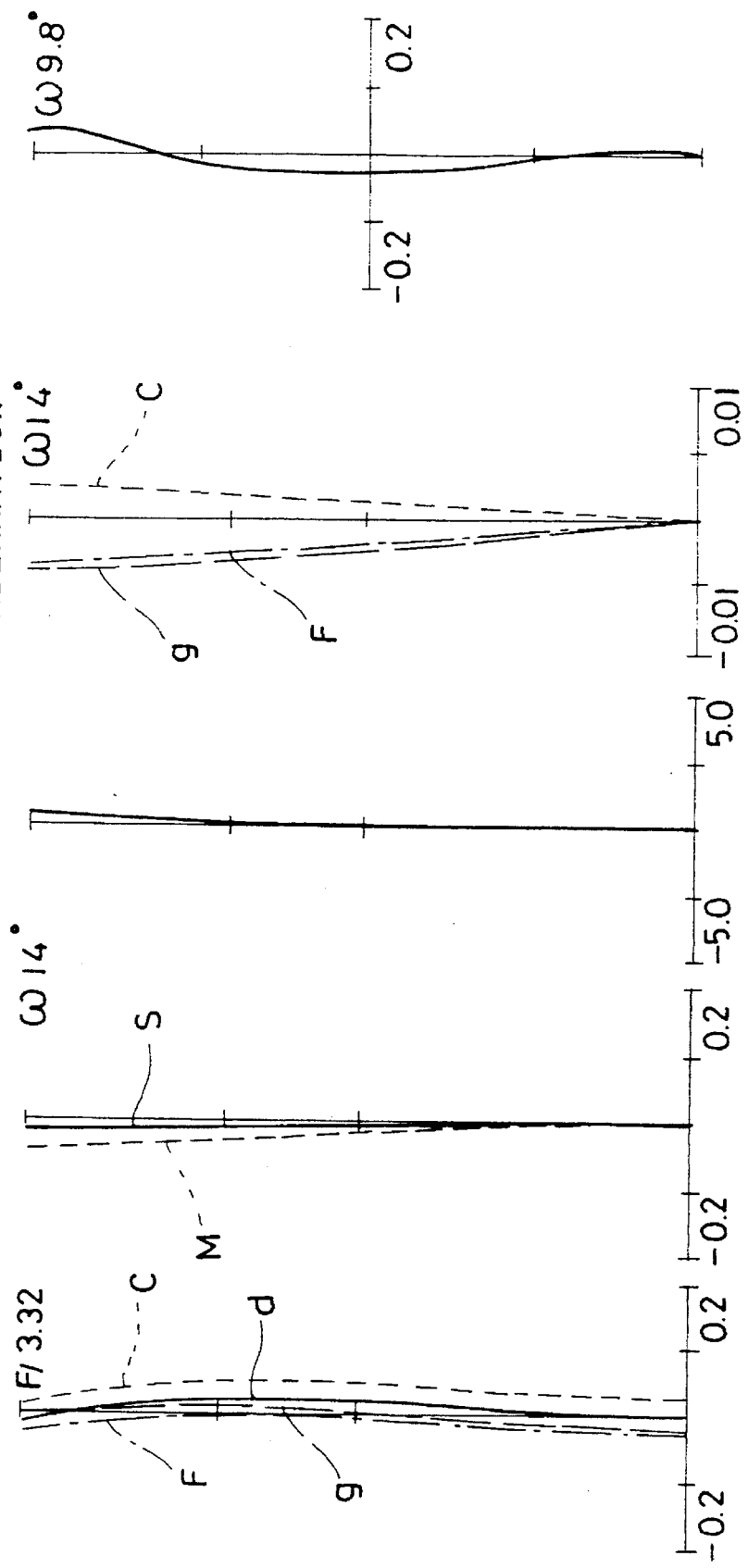

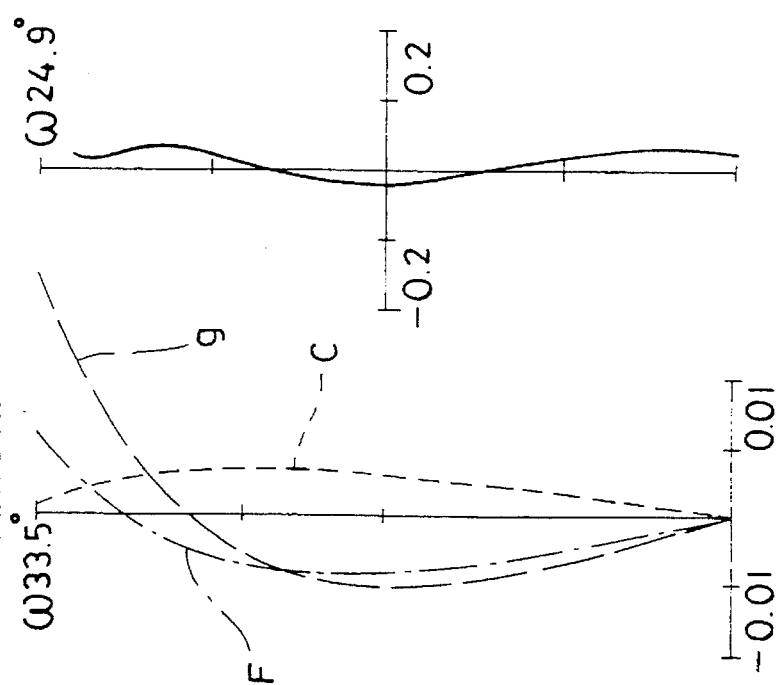
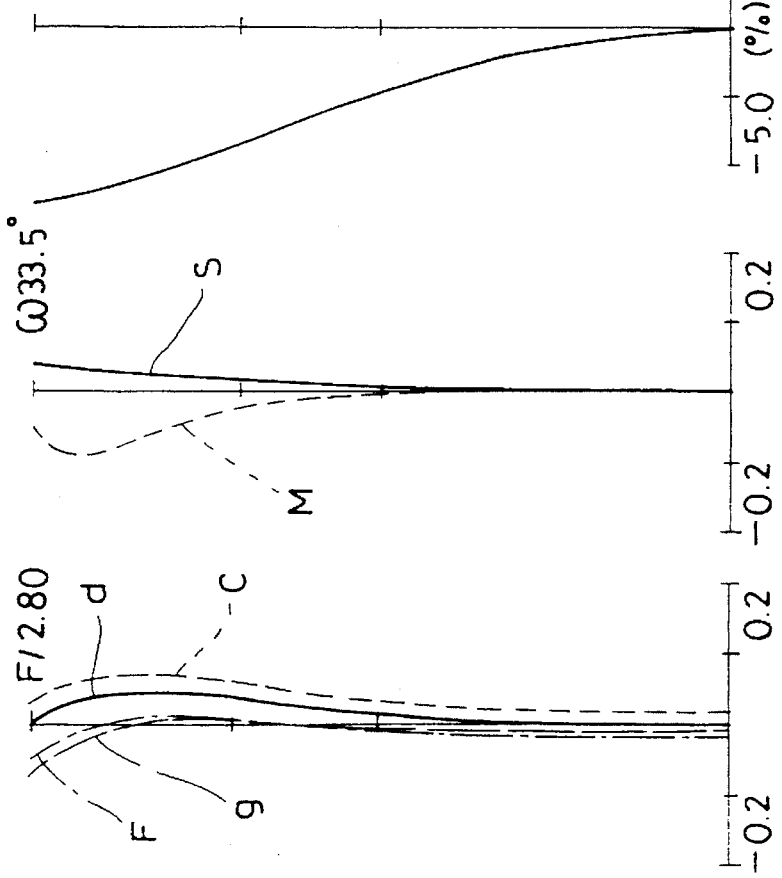

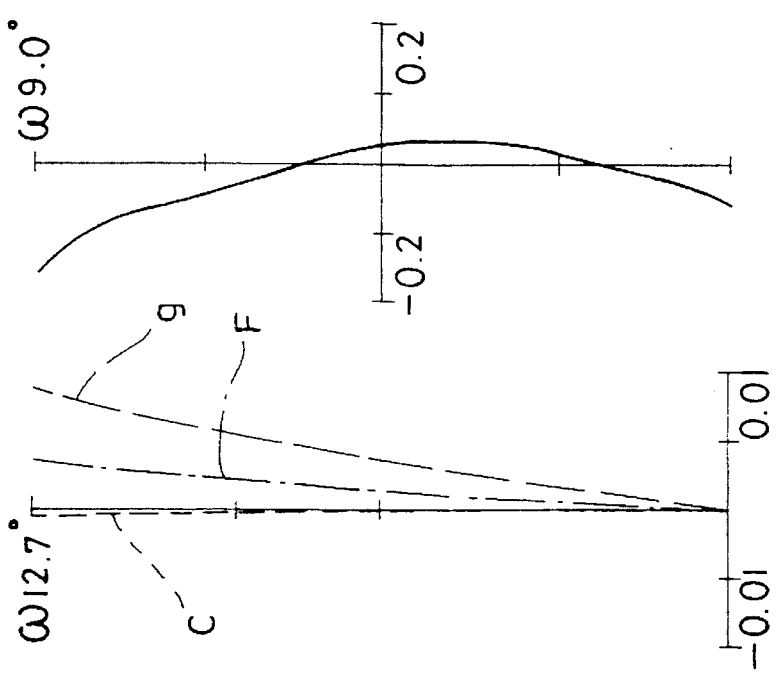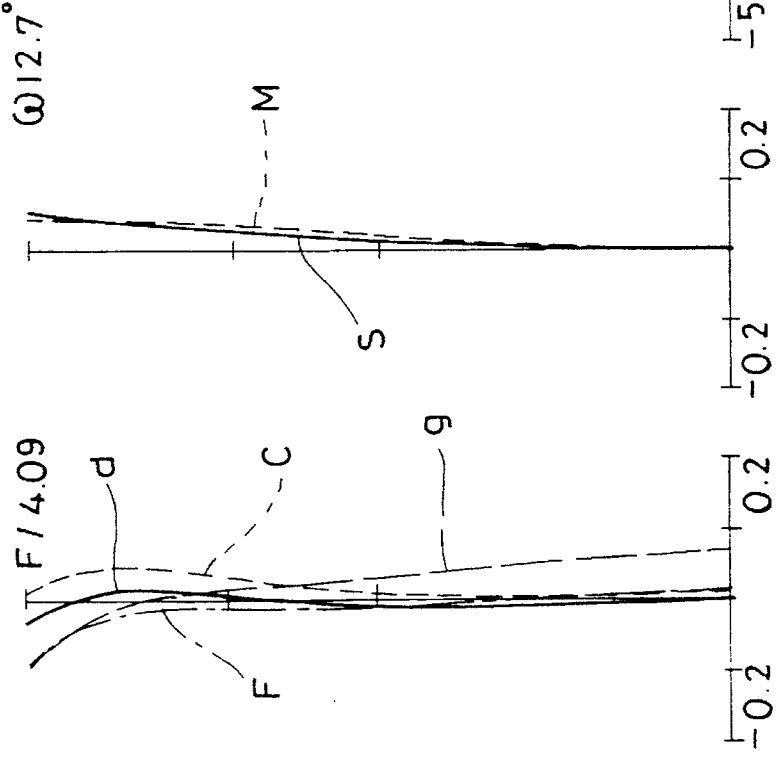

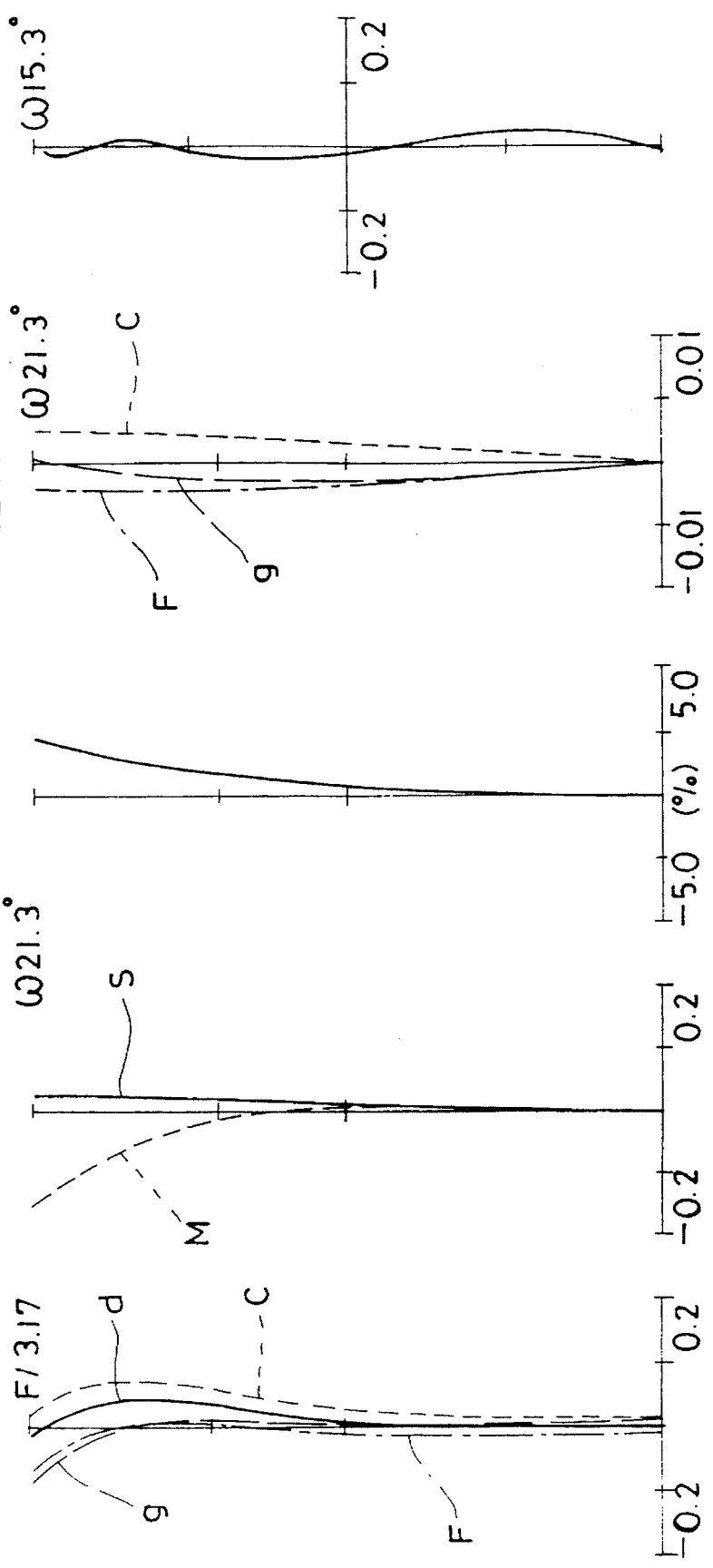

COMPACT WIDE-ANGLE VARIABLE FOCAL LENGTH LENS SYSTEM

BACKGROUND OF THE INVENTION a) Field of the invention

The present invention relates to a variable focal length lens system, and more specifically a compact variable focal length lens system which uses a solid-state image pickup device or the similar means as an image sensor, and is suited for use with electronic still cameras and video cameras.

b) Description of the prior art

In the recent years, it is demanded to reduce manufacturing costs and dimensions of variable focal length lens systems which are to be used with video cameras and so on. Under the current circumstances, in particular, it is demanded to configure these compact variable focal length lens systems so as to have high variable focal length ratios and wide field angles.

As variable focal length lens systems configured so as to meet these demands, there are known the lens systems disclosed by Japanese Patent Kokai Publication No. Hei 2-291,515 and No. Hei 1-246,517, each of which is composed of three or a smaller number of lens units including two movable lens units, and has a simple lens moving mechanism and a variable focal length ratio of 3 or higher.

However, each of the above-mentioned conventional examples adopts a front lens component which cannot be said to be sufficiently small, cannot have a variable focal length ratio on the order of 3 without using a non-homogenous lens component and cannot be configured so as to have a sufficiently wide field angle in any case, or has a field of 53° at widest at a wide position thereof.

SUMMARY OF THE INVENTION

A primary object of the present invention is to provide a compact variable focal length lens system for video cameras which can be manufactured at a low cost, has a variable focal length ratio of 3 to 3.5, an F number on the order of 2 and a field angle of at least 64° at a wide position thereof, and comprises six to seven lens components.

The variable focal length lens system according to the present invention comprises a first lens unit which is composed of a single positive lens component, a second lens unit which comprises at least one positive lens component and has a negative refractive power as a whole, a stop and a third lens unit which has a positive refractive power. The variable focal length lens system according to the present invention is configured so as to perform variation of a magnification thereof and adjustment of an image location by moving the second lens unit and the third lens unit along an optical axis in directions opposite to each other while keeping the first lens unit stationary.

In order that the variable focal length lens system can be manufactured at a low cost, the present invention selects a lens type which is composed of the three lens units including two lens units movable for changing a focal length of the lens system. Out of the known variable focal length lens systems, the one having the simplest composition consists of two front and rear lens units which are to be moved differently from each other for changing a focal length of the lens system. However, such a variable focal length lens system can have a variable focal length ration on the order of 2 at highest since only the rear lens unit has a function to change the focal length of the lens system and it is necessary, for enhancing the variable focal length ratio of the lens system, to move the rear lens unit for a long distance, thereby allowing remarkable variations of aberrations to be caused in the lens system by moving the rear lens unit.

The present invention has succeeded in configuring the variable focal length lens system so as to have a variable focal length ratio of 3 or higher by disposing the first lens unit, which has the positive refractive power and is to be kept stationary during the variation of a focal length of the lens system, on the object side of the front lens unit of the variable focal length lens system composed of the two lens units for imparting a function serving for the variation of the focal length of the lens system; composing the first lens unit of a single positive lens component; configuring the negative lens unit used as the front lens unit of the variable focal length lens system composed of the two lens units as the second lens unit which has the negative refractive power and comprises at least one positive lens component; composing the variable focal length lens system further using the third lens unit which has the positive refractive power; and selecting the lens composition to perform the variation of the focal length of the lens system and the adjustment of the image location by moving the second lens unit and the third lens unit along the optical axis in the directions opposite to each other.

Further, offaxial rays are divergent and a front lens component has a large diameter when the variable focal length lens system is configured so as to have a wide field angle. However, the present invention has succeeded in reducing a diameter of the front lens component by composing the first lens unit of lens components in a possible smallest number, thereby shortening a distance as measured from the object side lens component to the stop. Furthermore, in the variable focal length lens system according to the present invention in which the second lens unit and the third lens unit are moved monotonously for the variation of the focal length of the lens system, the third lens unit is moved so as to be located near the stop at a tele position of the variable focal length lens system. Owing to this fact, paraxial rays are restricted so as to lower incident rays on the first lens unit, whereby the front lens component need not have a large diameter. Moreover, spherical aberration and other aberrations can be corrected by using a single lens component in the variable focal length lens system according to the present invention. In addition, the present invention has succeeded in reducing a variation of chromatic aberration even when the variable focal length lens system has a high variable focal length ratio by disposing at least one positive lens component in the second lens unit so as to reduce an amount of chromatic aberration to be produced by the second lens unit which has a relatively strong refractive power. Owing to the measures which have been described above, the present invention has succeeded in providing the compact wide-angle variable focal length lens system.

The object of the present invention can be accomplished by composing the variable focal length lens system of the three lens units, selecting the lens composition of the variable focal length lens system described above, and configuring the second lens unit and the third lens unit so as to have the characteristics described above.

Further, it is desirable that the second lens unit is composed of a negative lens component and a positive lens component, and that the third lens unit is composed of a positive lens component and a negative lens component which are disposed separately from each other in order from the object side.

That is to say, the object of the present invention can be accomplished by: composing a variable focal length lens system, in order from the object side, of a first lens unit which has a positive refractive power and is to be kept stationary during a change of a focal length of the lens system, a second lens unit which consists of a negative lens component and a positive lens component, and has a negative refractive power as a whole, an aperture stop and a third lens unit which comprises a positive lens component and a negative lens component disposed separately from each other in order from the object side and has a positive refractive power as a whole; and configuring the lens system so as to perform a change of a focal length thereof and adjustment of image location by moving the second lens unit and the third lens unit along the optical axis in directions opposite to each other.

When the second lens unit is composed of the negative lens component and the positive lens component and has the negative refractive power as a whole as described above, the variation of chromatic aberration to be caused by the change of the focal length can be reduced by the positive lens component. Further, it is possible to configure the variable focal length lens system so as to have a wider field angle and a high variable focal length, or obtain a wider field angle at the wide position and a narrower field angle at the tele position of the lens system by composing each of the positive lens component and the negative lens component of a single lens element, and configuring the second lens unit so as to have minimum thickness on the optical axis.

Further, when the third lens unit is also composed of a positive lens component and a negative lens component, it is possible, while reducing an amount of chromatic aberration to be produced, to reduce thickness of the third lens unit as measured on the optical axis and obtain a composition which permits configuring a compact variable focal length lens system having a high variable focal length ratio by using a possible smallest number of lens components.

Furthermore, the variable focal length lens system according to the present invention, which has the composition described above wherein the positive lens component and the negative lens component are disposed separately from each other, permits not only controlling aberrations of high orders between surfaces of these lens components which are adjacent to each other but also correcting aberrations and minimizing the variations of aberrations with these two lens components.

However, it is possible to accomplish the object of the present invention by defining certain limits for magnifications, etc. of the respective lens units within certain ranges even when these lens units are not configured so as to have the characteristics described above.

Speaking more concretely, the variable focal length lens system according to the present invention consists, in order from the object side, of the first lens unit having the positive refractive power, the second lens unit having the negative refractive power and the third lens unit having the positive refractive power, is configured so as to perform the variation of the focal length thereof by moving the second lens unit and the third lens unit along the optical axis in the directions opposite to each other while keeping the first lens unit stationary, and satisfies the following conditions (1) and (2):

$$1.6(\beta_{2T}/\beta_{2W}) < \beta_{3T}/\beta_{3W} < 5.0(\beta_{2T}/\beta_{2W}) \quad (1)$$

$$5 < |f_2|/f_1 < 0.25 \quad (2)$$

wherein the reference symbols $f_1$ and $f_2$ represent focal length of the first lens unit and that of the second lens unit respectively, the reference symbols $\beta_{2T}$ and $\beta_{2W}$ designate magnifications of the second lens unit at the tele position and the wide position respectively of the variable focal length lens system, and the reference symbols $\beta_{3T}$ and $\beta_{3W}$ denote magnification of the third lens unit at the tele position and the wide position respectively of the variable focal length lens system. If $\beta_{3T}/\beta_{3W}$ exceeds the upperlimit of $5.0(\beta_{2T}/\beta_{2W})$ of the condition (1), the third lens unit will have a magnification which is to be varied at a high ratio, whereby aberrations will be varied remarkably by moving the third lens unit like those in the conventional variable focal length lens system which is composed of the two lens units and it will be difficult to obtain high quality images over an entire variable focal length range of the variable focal length lens system. If $\beta_3T/\beta_{3W}$ exceeds the lower limit of $1.6(\beta_{2T}/\beta_{2W})$ of the condition (1), in contrast, the second lens unit, which has the negative refractive power uniquely among the lens units, will have too strong a refractive power, thereby aggravating aberrations including chromatic aberration. For correcting these aberrations, it will be necessary to use an additional negative lens component or a positive lens component, thereby increasing the number of lens components to be disposed in the variable focal length lens system and prolonging the moving distance of the second lens unit. As a result, the first lens unit must be disposed far from the stop, whereby heights of rays will be large on the first lens unit and this lens unit will undesirably have a large diameter.

It is desirable to modify the above-mentioned condition (1) so as to have an upper limit of $3.0(\beta_{2T}/\beta_{2W})$ or configure the variable focal length lens system so as to satisfy the condition (1') shown below since the variations of aberrations will be reduced more remarkably and the first lens unit can be made compacter:

$$1.6(\beta_{2T}/\beta_{2W}) < \beta_{3T}/\beta_{3W} < 3.0\beta_{(2T}/\beta_{2W}) \quad (1')$$

The condition (2) defines a ratio of the focal length of the second lens unit relative to that of the first lens unit. For configuring a lens system so as to have a wide field angle, it is required to configure a first lens unit and a second lens unit which are to be disposed therein so as to have a total focal length of a small negative value, and it is necessary for meeting this requirement to weaken the positive refractive power of the first lens unit and strengthen the negative refractive power of the second lens unit.

If $|f_2|/f_1$ exceeds the upper limit of 0.25 of the condition (2), the refractive power of the first lens unit will be too strong for the refractive power of the second lens unit and the first lens unit will produce aberrations in large amounts. As a result, the first lens unit must be composed of a larger number of lens components for reducing the mounts of the aberrations to be produced by the first lens unit. If $|f_2|/f_1$ exceeds the lower limit of 0.05 of the condition (2), in contrast, the first lens unit will have too weak a refractive power, whereby the second lens unit must be moved for a longer distance in order to exhibit the same effect for changing the focal length of the variable focal length lens system and the lens components which are disposed before the stop will have larger diameters.

For obtaining a more adequate value of the ratio of the refractive power of the first lens unit relative to that of the second lens unit and balancing amounts of aberrations with the moving distances of the lens units, it is desirable to modify the condition (2) so as to have an upper limit of 0.2 and a lower limit of 0.07, or adopt, in place of the condition (2), the following condition (2'):

$$0.07 < |f_2|/f_1 < 0.2 \quad (2')$$

As is understood from the foregoing description, the object of the present invention can be accomplished by the variable focal length lens system which is composed of the three lens units, has the composition of the lens system described above, and uses the first lens unit and the second lens unit configured so as to have the characteristics described above or satisfy the conditions (1) and (2). However, it is more desirable for the variable focal length lens system according to the present invention to compose the second lens unit of a first lens component and a second lens component, and configure the lens system so as to satisfy the following conditions (3) and (4):

$$-1 < r_{21R}/r_{22F} < 0.5 \tag{3}$$

$$0.3 < r_{3F}/f_3 < 1.4 \tag{4}$$

wherein the reference symbol $r_{21R}$ represents a radius of curvature on an image side surface of the first lens component of the second lens unit, the reference symbol $r_{22F}$ designates a radius of curvature on an object side surface of the second lens component of the second lens unit, the reference symbol $r_{3F}$ denotes a radius of curvature on most object side surface of the third lens unit and the reference symbol $f_3$ represents a focal length of the third lens unit.

The condition (3) defines a ratio between a radius of curvature on the image side surface of the first lens component of the second lens unit and a radius of curvature on the object side surface of the second lens component of the second lens unit. Since it is required, for configuring the variable focal length lens system so as to have a wide field angle, to configure the second lens unit so as to have a principal point at a location which is as close as possible to the object side thereof, the first lens component of the second lens unit has an image side surface which is tend to be concave on the image side. This surface exhibits an effect to correct negative curvature of field and negative astigmatism, but produces aberrations of high order when curvature is high on the surface. For correcting these aberrations of high orders, it is desirable that the object side surface of the second lens component, which is disposed next to the image side surface of the first lens component, has a radius of curvature within the range defined by the condition (3). If $r_{21R}/r_{22F}$ exceeds the lower limit of $-1$ of the condition (3), it will be difficult to correct the aberrations of high orders which are produced by the image side surface of the first lens component. If $r_{21R}/r_{22F}$ exceeds the upper limit of 0.5 of the condition (3), in contrast, the function to shift the principal point of the second lens unit rearward will be strengthened contrary to the purpose to widen the field angle of the variable focal length lens system according to the present invention.

In order to balance reducing amounts of aberrations which are to be produced by the first lens component of the second lens unit with widening of the field angle, it is desirable to modify the condition (3) so as to have an upper limit of 0.3 and a lower limit of $-0.7$, or configure the variable focal length lens system so as to satisfy, in place of the condition (3), the following condition (3'):

$$-0.7 < r_{21R}/r_{22F} < 0.3 \tag{3'}$$

The condition (4) defines a radius of curvature on an object side surface of the third lens unit. Rays which have passed through a total lens unit composed of the first lens unit and the second lens unit are divergent. In order that the third lens unit abruptly converges these rays after they have passed through the stop, it is desirable that the object side surface of the first lens component of the third lens unit is convex on the object side and has curvature which is high to a certain degree. If $r_{3F}/f_3$ exceeds the upper limit of 1.4 of the condition (4), the object side surface of the first lens component of the third lens unit will have curvature too low for the focal length of the third lens unit, whereby incident rays will be high on the second lens component of the third lens unit and lens components disposed subsequently. As a result, these lens components will undesirably have large diameters. If $r_{3F}/f_3$ exceeds the lower limit of 0.3 of the condition (4), in contrast, the first lens component of the third lens unit will have too high curvature on the object side surface thereof, whereby rays will be incident at large angles on marginal portions of the lens components on the lens components which are mentioned above. As a result, negative aberrations will be produced undesirably in large amounts even when the object side surface of the first lens component of the third lens unit is configured as an aspherical surface.

For reducing amounts of aberrations which are to be produced by the first lens component of the third lens unit and lowering heights of rays which are to be incident on the second and subsequent lens components disposed in the third lens unit, it is desirable to modify the condition (4) so as to have an upper limit of 1.2 and a lower limit of 0.4, or configure the variable focal length lens system so as to satisfy, in place of the condition (4), following condition (4'):

$$0.4 < r_{3F}/f_3 < 1.2 \tag{4'}$$

As is described later with reference to embodiments of the present invention wherein aspherical surfaces are used in the second lens unit and the third lens unit, it is desirable to use a single aspherical surface or a plurality of aspherical surfaces in the first lens unit, the second lens unit and/or the third lens unit since the aspherical surface or surfaces makes or make it possible to correct aberrations more favorably in a variable focal length lens system using the aspherical surface or surfaces than those in variable focal length lens systems which are composed only of spherical lens components.

Further, the variable focal length lens system according to the present invention can be focused by moving any one lens unit or a plurality of lens units out of the three lens units.

BRIEF DESCRIPTION OF THE DRAWINGS

FIGS. 5A–5E show graphs illustrating aberration characteristics of the first embodiment of the present invention at a wide position thereof;

FIGS. 6A–6E show graphs illustrating aberration characteristics at an intermediate focal length of the first embodiment of the present invention;

FIGS. 7A–7E show graphs illustrating aberration characteristics at a tele position of the first embodiment of the present invention;

FIGS. 8A–8E show curves visualizing aberration characteristics at the wide position of the second embodiment of the present invention;

FIGS. 9A–9E show curves visualizing aberration characteristics at the intermediate focal length of the second embodiment of the present invention;

FIGS. 10A–10E show curves visualizing aberration characteristics at the tele position of the second embodiment of the present invention;

FIGS. 11A–11E show graphs visualizing aberration characteristics at the wide position of the third embodiment of the present invention;

FIGS. 12A–12E show graphs visualizing aberration characteristics at the intermediate focal length of the third embodiment of the present invention;

FIGS. 13A–13E show graphs visualizing aberration characteristics at the tele position of the third embodiment of the present invention;

FIGS. 14A–14E show graphs visualizing aberration characteristics at the wide position of the fourth embodiment of the present invention;

FIGS. 15A–15E show graphs visualizing aberration characteristics at the intermediate focal length of the fourth embodiment of the present invention; and FIGS. 16A–16E show graphs visualizing aberration characteristics at the tele position of the fourth embodiment of the present invention.

DETAILED DESCRIPTION OF THE PREFERRED EMBODIMENTS

Figure 1:
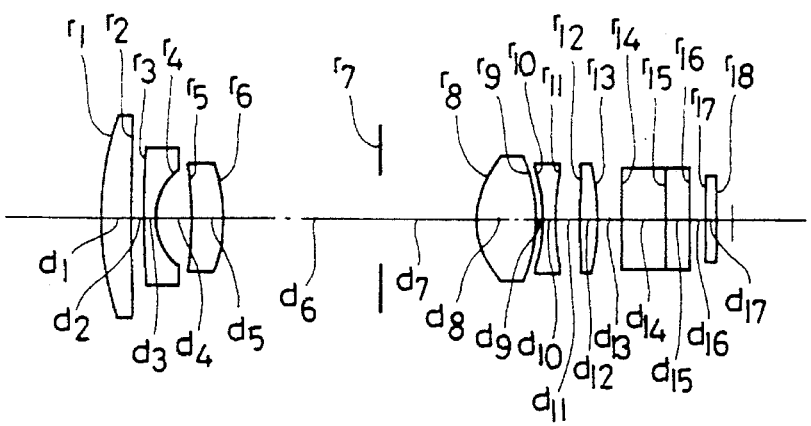
FIGS. 1(W–T) through FIGS. 4(4W–4T) show sectional views illustrating compositions of a first embodiment through a third embodiment of the variable focal length lens system according to the present invention.
Figure 1:
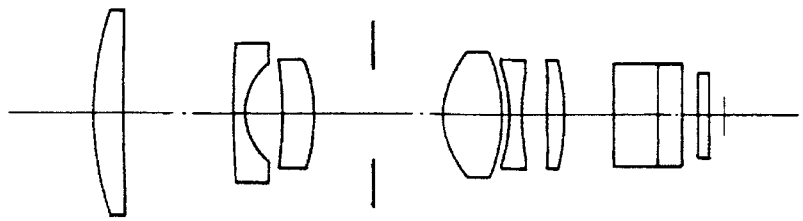
Figure 1:
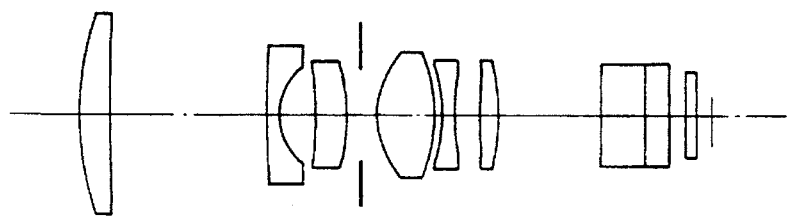

Now, the variable focal length lens system according to the present invention will be described more detailedly below with reference to the preferred embodiments thereof illustrated in the accompanying drawings and given in the form of the following numerical data:

Embodiment 1

$f = 3.6 \sim 12$, F/2, $2\omega = 64° \sim 21°$
$r_1 = 19.8752$
 $d_1 = 2.000$   $n_1 = 1.48749$   $\nu_1 = 70.20$
$r_2 = 123.5203$
 $d_2 = D_1$ (variable)
$r_3 = 59.3562$
 $d_3 = 0.800$   $n_2 = 1.77250$   $\nu_2 = 49.66$
$r_4 = 3.8570$
 $d_4 = 2.395$
$r_5 = -24.9968$
 $d_5 = 2.130$   $n_3 = 1.80518$   $\nu_3 = 25.43$
$r_6 = -13.7018$ (aspherical surface)
 $d_6 = D_2$ (variable)
$r_7 = \infty$ (stop)
 $d_7 = D_3$ (variable)
$r_8 = 5.6016$ (aspherical surface)
 $d_8 = 3.915$   $n_4 = 1.66910$   $\nu_4 = 55.40$
$r_9 = -9.9579$
 $d_9 = 0.500$
$r_{10} = -8.6062$
 $d_{10} = 0.750$   $n_5 = 1.80518$   $\nu_5 = 25.43$
$r_{11} = 16.2769$
 $d_{11} = 1.647$
$r_{12} = 24.7101$ (aspherical surface)
 $d_{12} = 1.200$   $n_6 = 1.66910$   $\nu_6 = 55.40$
$r_{13} = -14.1635$
 $d_{13} = D_4$ (variable)
$r_{14} = \infty$
 $d_{14} = 2.900$   $n_7 = 1.51633$   $\nu_7 = 64.15$
$r_{15} = \infty$
 $d_{15} = 1.600$   $n_8 = 1.54771$   $\nu_8 = 62.83$
$r_{16} = \infty$
 $d_{16} = 1.000$
$r_{17} = \infty$
 $d_{17} = 0.750$   $n_9 = 1.51633$   $\nu_9 = 64.15$
$r_{18} = \infty$ aspherical surface coefficients (6th surface)   $P = 1.0000$, $A_4 = -0.74939 \times 10^{-3}$, $A_6 = 0.78345 \times 10^{-5}$ $A_8 = -0.28126 \times 10^{-5}$,
$A_{10} = 0$, $A_{12} = 0$
(8th surface)   $P = 1.0000$, $A_4 = -0.45665 \times 10^{-3}$,
$A_6 = 0.35705 \times 10^{-5}$ $A_8 = -0.10360 \times 10^{-5}$,
$A_{10} = 0$, $A_{12} = 0$
(12th surface)   $P = 1.0000$, $A_4 = -0.10513 \times 10^{-2}$,
$A_6 = -0.11837 \times 10^{-3}$ $A_8 = 0.59421 \times 10^{-5}$,
$A_{10} = 0$, $A_{12} = 0$

| f | 3.6 | 6.6 | 12 |
|---|---|---|---|
| $D_1$ | 0.8000 | 7.2807 | 10.3558 |
| $D_2$ | 10.5558 | 4.0751 | 1.0000 |
| $D_3$ | 6.2418 | 4.5142 | 1.0000 |
| $D_4$ | 1.6065 | 3.3341 | 6.8483 |

$\beta_{3T}/\beta_{3W} = 1.90(\beta_{2T}/\beta_{2W})$, $|f_2|/f_1 = 0.16$
$r_{21R}/r_{22F} = -0.15$, $r_{3F}/f_3 = 0.62$ Embodiment 2

$f = 3.6 \sim 12$, F/2, $2\omega = 64° \sim 21°$
$r_1 = 17.8280$
 $d_1 = 1.800$   $n_1 = 1.48749$   $\nu_1 = 70.20$
$r_2 = 83.6145$
 $d_2 = D_1$ (variable)
$r_3 = 37.3469$
 $d_3 = 1.000$   $n_2 = 1.77250$   $\nu_2 = 49.66$
$r_4 = 3.8729$
 $d_4 = 2.600$
$r_5 = 28.3615$ (aspherical surface)
 $d_5 = 1.300$   $n_3 = 1.80518$   $\nu_3 = 25.43$
$r_6 = -254.9822$
 $d_6 = D_2$ (variable)
$r_7 = \infty$ (stop)
 $d_7 = D_3$ (variable)
$r_8 = 8.9772$ (aspherical surface)
 $d_8 = 2.300$   $n_4 = 1.66910$   $\nu_4 = 55.40$
$r_9 = 3605.5407$
 $d_9 = 0.150$
$r_{10} = 8.7373$
 $d_{10} = 2.380$   $n_5 = 1.67000$   $\nu_5 = 51.62$
$r_{11} = -19.6719$
 $d_{11} = 0.100$
$r_{12} = 17.7501$
 $d_{12} = 0.700$   $n_6 = 1.80518$   $\nu_6 = 25.43$
$r_{13} = 3.8188$
 $d_{13} = 1.180$
$r_{14} = 12.2245$ (aspherical surface)
 $d_{14} = 2.200$   $n_7 = 1.66910$   $\nu_7 = 55.40$
$r_{15} = -13.7931$
 $d_{15} = D_4$ (variable)
$r_{16} = \infty$
 $d_{16} = 2.900$   $n_8 = 1.51633$   $\nu_8 = 64.15$
$r_{17} = \infty$
 $d_{17} = 1.600$   $n_9 = 1.61700$   $\nu_9 = 62.79$
$r_{18} = \infty$
 $d_{18} = 1.000$
$r_{19} = \infty$
 $d_{19} = 0.750$   $n_{10} = 1.51633$   $\nu_{10} = 64.15$
$r_{20} = \infty$ aspherical surface coefficients (5th surface)   $P = 1.0000$, $A_4 = 0.83801 \times 10^{-3}$,
$A_6 = 0.54288 \times 10^{-5}$ $A_8 = 0.30505 \times 10^{-5}$,
$A_{10} = 0$, $A_{12} = 0$
(8th surface)   $P = 1.0000$, $A_4 = -0.71878 \times 10^{-3}$,
$A_6 = -0.42828 \times 10^{-5}$ $A_8 = -0.24556 \times 10^{-6}$,
$A_{10} = 0$, $A_{12} = 0$
(14th surface)   $P = 1.0000$, $A_4 = 0.95034 \times 10^{-3}$,
$A_6 = -0.29226 \times 10^{-4}$ $A_8 = 0.10814 \times 10^{-4}$,
$A_{10} = 0$, $A_{12} = 0$

| f | 3.6 | 6.6 | 12 |
|---|---|---|---|
| $D_1$ | 0.8000 | 7.1339 | 10.5637 |
| $D_2$ | 10.7711 | 4.4361 | 1.0000 |

-continued

| | | | |
|---|---|---|---|
| $D_3$ | 5.4821 | 3.9886 | 1.0000 |
| $D_4$ | 1.0000 | 2.4945 | 5.4894 |

$\beta_{3T}/\beta_{3W} = 1.77(\beta_{2T}/\beta_{2W})$, $|f_2|/f_1 = 0.17$
$r_{21R}/r_{22F} = 0.14$, $r_{3F}/f_3 = 0.95$ Embodiment 3

$f = 3 \sim 9$, F/2, $2\omega = 74° \sim 28°$
$r_1 = 37.4532$
    $d_1 = 2.000$        $n_1 = 1.48749$     $v_1 = 70.20$
$r_2 = -147.9374$
    $d_2 = D_1$ (variable)
$r_3 = 17.8127$
    $d_3 = 0.800$        $n_2 = 1.77250$     $v_2 = 49.66$
$r_4 = 3.6601$
    $d_4 = 2.495$
$r_5 = -9.4772$
    $d_5 = 0.800$        $n_3 = 1.48749$     $v_3 = 70.20$
$r_6 = 434.0601$
    $d_6 = 1.800$        $n_4 = 1.80518$     $v_4 = 25.43$
$r_7 = -17.0977$ (aspherical surface)
    $d_7 = D_2$ (variable)
$r_8 = \infty$ (stop)
    $d_8 = D_3$ (variable)
$r_9 = 5.5008$ (aspherical surface)
    $d_9 = 3.700$        $n_5 = 1.66910$     $v_5 = 55.40$
$r_{10} = -7.2709$
    $d_{10} = 0.700$     $n_6 = 1.80518$     $v_6 = 25.43$
$r_{11} = 63.1642$
    $d_{11} = 1.548$
$r_{12} = 38.0396$ (aspherical surface)
    $d_{12} = 1.200$     $n_7 = 1.66910$     $v_7 = 55.40$
$r_{13} = -18.4313$
    $d_{13} = D_4$ (variable)
$r_{14} = \infty$
    $d_{14} = 2.900$     $n_8 = 1.51633$     $v_8 = 64.15$
$r_{15} = \infty$
    $d_{15} = 1.600$     $n_9 = 1.54771$     $v_9 = 62.83$
$r_{16} = \infty$
    $d_{16} = 1.000$
$r_{17} = \infty$
    $d_{17} = 0.750$     $n_{10} = 1.51633$  $v_{10} = 64.15$
$r_{18} = \infty$ aspherical surface coefficients (7th surface)   $P = 1.0000$, $A_4 = -0.49714 \times 10^{-3}$,
                $A_6 = 0.54288 \times 10^{-5}$ $A_8 = 0.16258 \times 10^{-6}$,
                $A_{10} = 0$, $A_{12} = 0$
(9th surface)   $P = 1.0000$, $A_4 = -0.29799 \times 10^{-3}$,
                $A_6 = 0.61356 \times 10^{-5}$ $A_8 = 0.15801 \times 10^{-6}$,
                $A_{10} = 0$, $A_{12} = 0$
(12th surface)  $P = 1.0000$, $A_4 = -0.16543 \times 10^{-2}$,
                $A_6 = -0.29226 \times 10^{-4}$ $A_8 = 0.10814 \times 10^{-4}$,
                $A_{10} = 0$, $A_{12} = 0$

| f | 3 | 5.5 | 9 |
|---|---|---|---|
| $D_1$ | 0.8000 | 6.3493 | 8.5050 |
| $D_2$ | 8.7050 | 3.1558 | 1.0000 |
| $D_3$ | 5.8865 | 4.2090 | 1.0000 |
| $D_4$ | 1.3371 | 3.0146 | 6.2236 |

$\beta_{3T}/\beta_{3W} = 2.18(\beta_{2T}/\beta_{2W})$, $|f_2|/f_1 = 0.11$
$r_{21R}/r_{22F} = -0.39$, $r_{3F}/f_3 = 0.69$ Embodiment 4

$f = 3.4 \sim 10$, F/2.8, $2\omega = 67° \sim 25.4°$
$r_1 = 61.1017$
    $d_1 = 2.200$        $n_1 = 1.60311$     $v_1 = 60.70$
$r_2 = -282.2260$
    $d_2 = D_1$ (variable)
$r_3 = 15.8672$
    $d_3 = 0.800$        $n_2 = 1.77250$     $v_2 = 49.66$
$r_4 = 4.3492$
    $d_4 = 4.430$
$r_5 = -15.8348$
    $d_5 = 2.470$        $n_3 = 1.80518$     $v_3 = 25.43$
$r_6 = -14.0815$ (aspherical surface)
    $d_6 = D_2$ (variable)
$r_7 = \infty$ (stop)
    $d_7 = D_3$ (variable)
$r_8 = 4.6922$ (aspherical surface)
    $d_8 = 3.600$        $n_4 = 1.67790$     $v_4 = 55.33$
$r_9 = -8.1322$ (aspherical surface)
    $d_9 = 0.150$
$r_{10} = 13.9633$
    $d_{10} = 0.700$     $n_5 = 1.84666$     $v_5 = 23.78$
$r_{11} = 3.7871$
    $d_{11} = D_4$ (variable)
$r_{12} = \infty$
    $d_{12} = 2.900$     $n_6 = 1.51633$     $v_6 = 64.15$
$r_{13} = \infty$
    $d_{13} = 1.600$     $n_7 = 1.61700$     $v_7 = 62.79$
$r_{14} = \infty$
    $d_{14} = 1.000$
$r_{15} = \infty$
    $d_{15} = 0.750$     $n_8 = 1.51633$     $v_8 = 64.15$
$r_{16} = \infty$ aspherical surface coefficients (6th surface)   $P = 1.0000$, $A_4 = -0.32937 \times 10^{-3}$
                $A_6 = -0.30442 \times 10^{-5}$, $A_8 = -0.22660 \times 10^{-6}$
                $A_{10} = -0.21155 \times 10^{-8}$, $A_{12} = -0.22480 \times 10^{-9}$
(8th surface)   $P = 1.0000$, $A_4 = -0.98685 \times 10^{-3}$
                $A_6 = -0.31950 \times 10^{-4}$, $A_8 = -0.17116 \times 10^{-5}$
                $A_{10} = 0.83682 \times 10^{-6}$, $A_{12} = -0.32465 \times 10^{-7}$
(9th surface)   $P = 1.0000$, $A_4 = 0.29144 \times 10^{-2}$
                $A_6 = -0.10956 \times 10^{-3}$, $A_8 = -0.87201 \times 10^{-6}$
                $A_{10} = 0.19909 \times 10^{-5}$, $A_{12} = -0.45010 \times 10^{-8}$

| f | 3.4 | 5.8 | 10 |
|---|---|---|---|
| $D_1$ | 0.8000 | 9.5435 | 14.8684 |
| $D_2$ | 15.8184 | 7.0749 | 1.7500 |
| $D_3$ | 5.2207 | 3.9766 | 1.7500 |
| $D_4$ | 2.0878 | 3.3319 | 5.5585 |

$\beta_{3T}/\beta_{3W} = 1.90(\beta_{2T}/\beta_{2W})$, $|f_2|/f_1 = 0.12$
$r_{21R}/r_{22F} = -0.27$, $r_{3F}/f_3 = 0.54$ wherein the reference symbols $r_1, r_2, \ldots$ represent radii of curvature on surfaces of respective lens components, the reference symbols $d_1, d_2, \ldots$ designate thicknesses of the respective lens components and airspaces reserved therebetween, the reference symbols $n_1, n_2, \ldots$ represent refractive indises of the respective lens components and the reference symbols $v_1, v_2, \ldots$ disignate Abbe's numbers of the respective lens components.

The first embodiment of the present invention has a composition illustrated in FIG. 1, wherein the first lens unit consists of a single positive lens component, the second lens unit is composed, in order from the object side, of a negative meniscus lens component having a convex surface on the object side and a positive lens component, and the third lens unit is composed, in order from the object side, of a positive lens component, a negative lens component and a positive lens component. Further, the fourteenth surface ($r_{14}$) through the eighteenth surface ($r_{18}$) are those of optical members such as filters.

Figure 2:
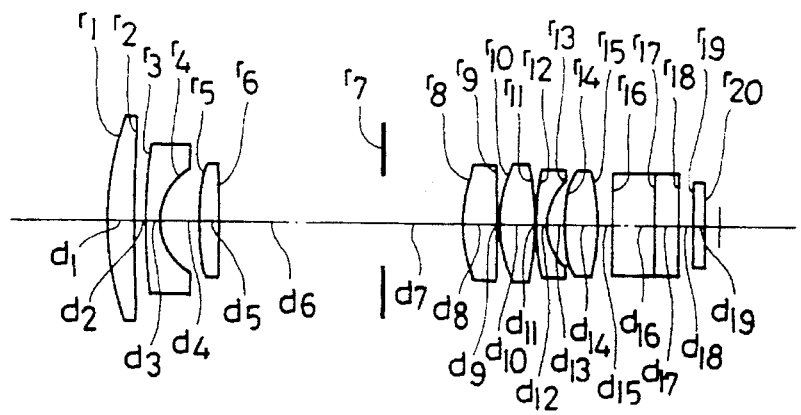
Figure 2:
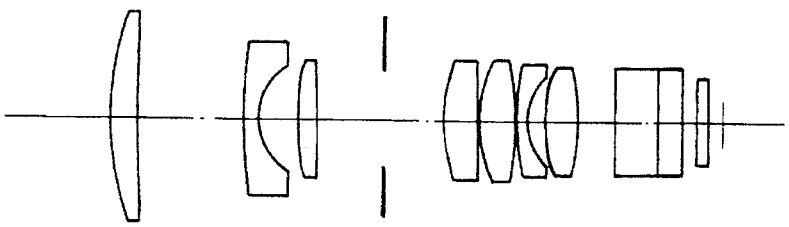
Figure 2:
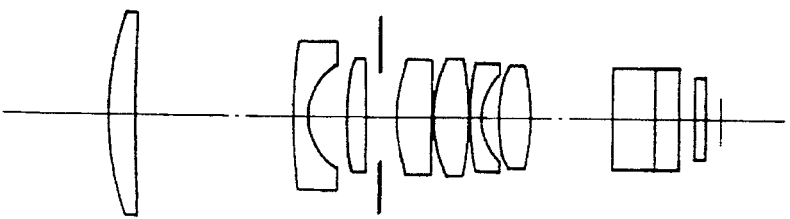

The second embodiment of the present invention has a composition illustrated in FIG. 2, wherein the first lens unit consists of a single positive lens component, the second lens unit is composed, in order from the object side, of a negative meniscus lens component having a convex surface on the object side and a positive lens component, and the third lens unit consists of a positive lens component, a positive lens component, a negative lens component and a positive lens component. Further, the sixteenth surface ($r_{16}$) through the twentieth surface ($r_{20}$) are those of optical members such as filters.

Figure 3:
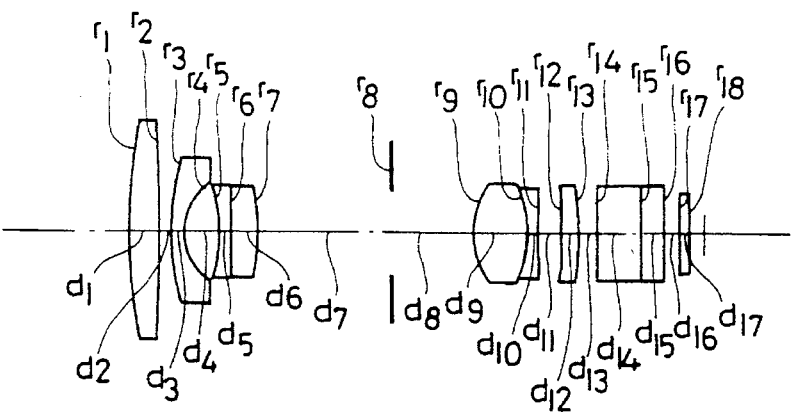
Figure 3:
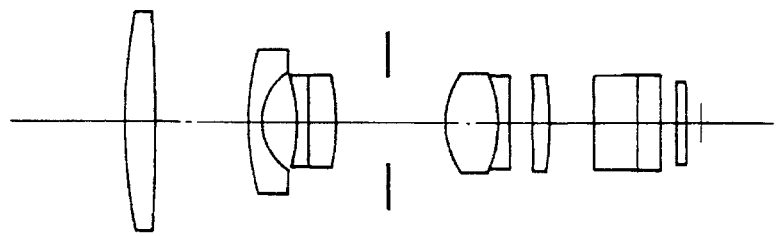
Figure 3:
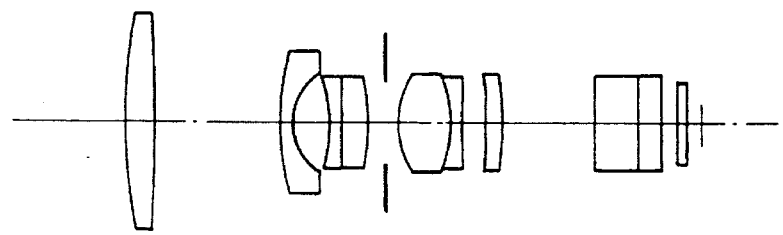
Figure 4:
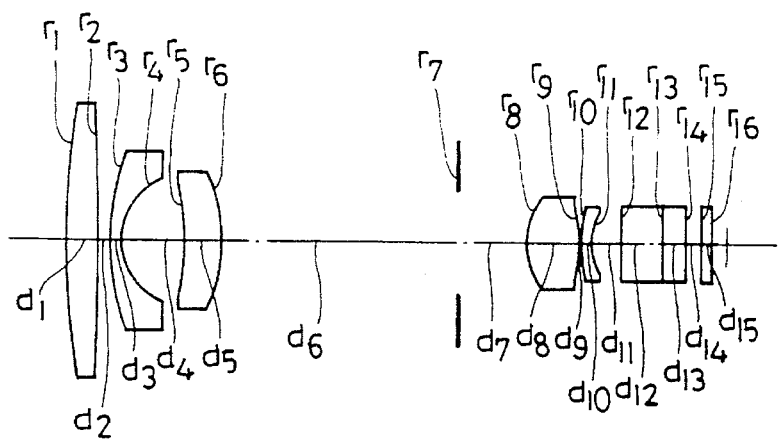
Figure 4:
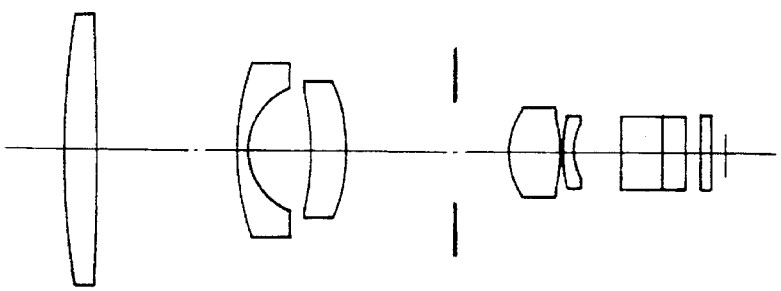
Figure 4:
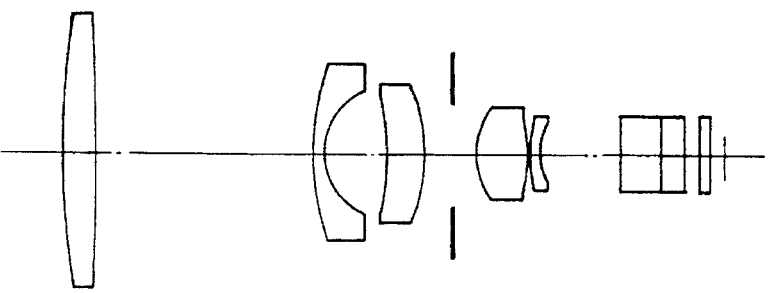

In the third embodiment of the present invention illustrated in FIG. 3, the first lens unit consists of a single positive lens component, the second lens unit is composed, in order from the object side, of a negative meniscus lens component, a negative lens component and a positive lens component, and the third lens unit consists of a positive lens component, a negative lens component and a positive lens component. In the third embodiment, the negative lens component and the positive lens component are cemented to each other in the second lens unit, and the first positive lens component and the negative lens component are cemented to each other in the third lens unit. Further, the fourteenth surface ($r_{14}$) through the eighteenth surfaces ($r_{18}$) are those of optical members such as filters.

In the fourth embodiment, the first lens unit is composed of a positive lens component, the second lens unit consists of a negative lens component and a positive lens component, and the third lens unit is composed of a positive lens component and a negative lens component. In addition, the reference symbols $r_{12}$ through $r_{16}$ represent optical members such as filters.

In each of the first through fourth embodiments of the present invention which have been described above, each of the positive lens component disposed in the second lens unit, and the first lens component and the final lens component of the third lens unit has an aspherical surface expressed by the formula shown below:

$$x = \frac{y^2/r}{1 + \sqrt{1 - p(y/r)^2}} + A_4 y^4 + A_6 y^6 + A_8 y^8 + A_{10} y^{10} + A_{12} y^{12}$$

wherein a direction along the optical axis is taken as the x axis, a direction perpendicular to the optical axis is taken as the y axis, the reference symbol r represents a paraxial radius of curvature, the reference symbol p designates a conical constant, and the reference symbols $A_4$, $A_6$ and $A_8$ denote aspherical surface coefficients of the fourth, sixth and eighth orders respectively.

The present invention has succeeded in providing a compact, wide-angle variable focal length lens system which has a field angle of 64° to 74°, a variable focal length ratio of 3 to 3.3, an F number on the order of 2, and consists of six to seven lens components.

I claim:

1. A variable focal length lens system comprising, in order from the object side: a first lens unit of a single positive lens component, a second lens unit which comprises a positive lens component and a negative lens component, and has a negative refractive power as a whole, an aperture stop and a third lens unit having a positive refractive power;

wherein said variable focal length lens system is configured so as to vary a focal length of the lens system as a whole by moving said second lens unit and said third lens unit along an optical axis in directions reverse to each other while keeping said first lens unit stationary on the optical axis.

2. A variable focal length lens system comprising, in order from the object side; a first lens unit having a positive refractive power, a second lens unit having a negative refractive power and a third lens unit having a positive refractive power; wherein said variable focal length lens system is configured so as to vary a focal length of the lens system as a whole by moving said second lens unit and said third lens unit along an optical axis in directions reverse to each other while keeping said first lens unit stationary on the optical axis, and wherein said variable focal length lens system is configured so as to satisfy the following conditions (1) and (2):

$$1.6(\beta_{2T}/\beta_{2W}) < \beta_{3T}/\beta_{3W} < 5.0(\beta_{2T}/\beta_{2W}) \qquad (1)$$

$$0.05 < |f_2|/f_1 < 0.25 \qquad (2)$$

wherein the reference symbols $f_1$ and $f_2$ represent a focal length of said first lens unit and that of said second lens unit respectively, the reference symbols $\beta_{2T}$ and $\beta_{2W}$ designate magnifications of said second lens unit at a wide position and a tele position respectively of said variable focal length lens system, and the reference symbols $\beta_{3T}$ and $\beta_{3W}$ denote magnifications of said third lens unit at a wide position and a tele position respectively of said variable focal length lens system.

3. A variable focal length lens system according to claim 1 or 2 wherein said second lens unit is composed of a first lens component and a second lens component, and satisfy the following conditions (3) and (4):

$$-1 < r_{21R}/r_{22F} < 0.5 \qquad (3)$$

$$0.3 < r_{3F}/f_3 < 1.4 \qquad (4)$$

wherein the reference symbol $r_{21R}$ represents a radius of curvature on an image side surface of said second lens unit, the reference symbol $r_{22F}$ designates a radius of curvature on an object side surface of said second lens unit, the reference symbol $r_{3R}$ denotes a radius of curvature on the most object side surface of said third lens unit and the reference symbol $f_3$ represents a focal length of said third lens unit.

4. A variable focal length lens system according to claim 1 or 2 satisfying the following conditions (1') and (2'):

$$1.6(\beta_{2T}/\beta_{2W}) < \beta_{3T}/\beta_{3W} < 3.0(\beta_{2T}/\beta_{2W}) \qquad (1')$$

$$0.07 < |f_2|/f_1 < 0.2 \qquad (2')$$

5. A variable focal length lens system according to claim 1 or 2 satisfying the following conditions (3') and (4'):

$$-0.7 < r_{21R}/r_{22F} < 0.3 \qquad (3')$$

$$0.4 < r_{3F}/f_3 < 1.2 \qquad (4')$$

6. A variable focal length lens system according to claim 4 satisfying the following conditions (3') and (4'):

$$-0.7 < r_{21R}/r_{22F} < 0.3 \qquad (3')$$

$$0.4 < r_{3F}/f_3 < 1.2 \qquad (4')$$

* * * * *